W. H. GRAFTON.
INDEX GUIDE FOR BALANCE WHEELS.
APPLICATION FILED JAN. 14, 1915.
1,147,938.
Patented July 27, 1915.
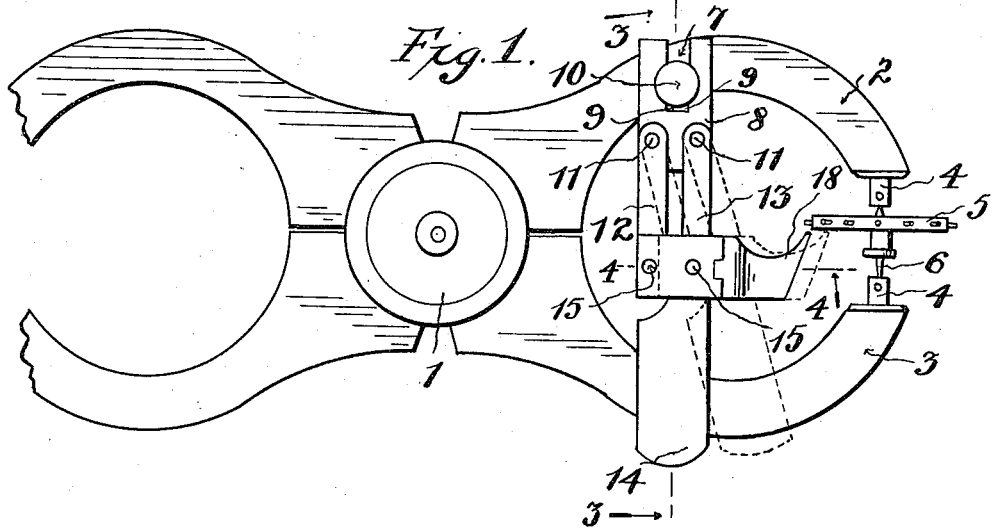
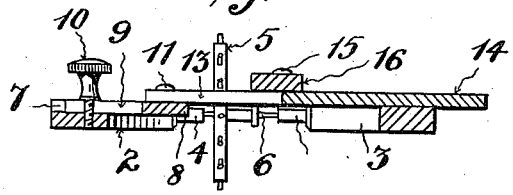
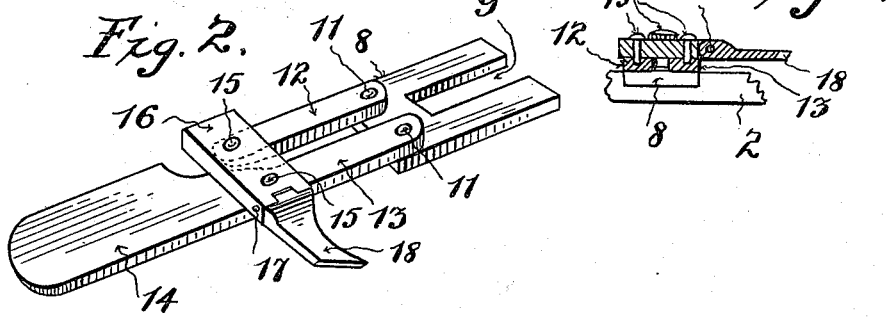
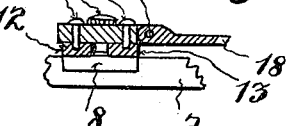
Witnesses:
H. Podziuski
Julius Bregman
Inventor
William H. Grafton
By his Attorney
Joseph L. Levy
COLUMBIA PLANOGRAPH CO., WASHINGTON, D. C.

UNITED STATES PATENT OFFICE.

WILLIAM H. GRAFTON, OF CLEVELAND, OHIO, ASSIGNOR TO HAMMEL RIGLANDER & CO., OF NEW YORK, N. Y., A CORPORATION OF NEW YORK.

INDEX-GUIDE FOR BALANCE-WHEELS.

1,147,938.

Specification of Letters Patent.

Patented July 27, 1915.

Application filed January 14, 1915. Serial No. 2,134.

*To all whom it may concern:*

Be it known that I, WILLIAM H. GRAFTON, a citizen of the United States, and a resident of the city of Cleveland, county of Cuyahoga, and State of Ohio, have invented certain new and useful Improvements in Index-Guides for Balance-Wheels, of which the following is a specification.

This invention relates to a device for testing balance wheels for watches and the like for the purpose of ascertaining if any irregularities are to be found in such balance wheels. Articles of this kind heretofore made require a great deal of time to adjust properly to test each balance wheel, the same being of varying sizes, and it is the object of this invention to provide a device which can readily be adjusted to test the varying sizes of balance wheels for irregularities with the greatest possible speed, and one which will perform this task more completely than that of the index guides heretofore made. These and other embodiments are accomplished by my invention, a more particular description of which will appear below.

Reference is to be had to the accompanying drawings, in which—

Figure 1 is a plan view of a pair of calipers with my improved index guide mounted thereon; Fig. 2 is a perspective view of my improved index guide removed from the calipers; Fig. 3 is a sectional view on the line 3—3 of Fig. 1 looking in the direction of the arrows; and Fig. 4 is a sectional view on the line 4—4 of Fig. 1, looking in the direction of the arrows.

While I have shown my invention used in connection with the testing of balance wheels, it is obvious that the same may be used for any other like purpose.

My improved guide is mounted on a device 1 having a pair of jaws 2 and 3, said jaws being pivoted at the center and adapted to be moved apart to receive a balance wheel in specially made bearing points 4, which points may be used as caliper points if desired, the jaws 2 and 3 being adapted to be moved to and from each other to hold or release the arbor 6 of the balance wheel 5. In the jaw 2 is a recess 7 and mounted in said recess is a plate 8, the recess 7 preventing side movement of the plate 8, said plate being slotted as at 9, and extending through said slot for the purpose of holding the plate to the jaw 2 is a set screw 10. Pivoted to the plate 8 by pins 11 are parallel bars 12 and 13, the bar 13 being widened at its end 14 to form a handle for movement of the index guide. Mounted on the parallel bars 12 and 13, adjacent the end of the bar 12, and at the end of the narrow portion of the bar 13, by pins 15, each of said pins 15 being at an equal distance from the pins 11, is a block 16 in which is pivoted, by means of a pin 17, the testing-point 18.

The index guides of the type heretofore made have consisted of a single plate upon which is mounted the testing-point, one end of the plate being slotted for the reception of the set screw for holding the plate to the jaw. To adjust the same to ascertain whether the periphery of the wheel is exactly true or the width of the band encircling the wheel is exactly the same throughout, it is necessary to unloosen the set screw and move the plate forward or backward across the jaws until the testing point is brought into contact with the wheel at the point desired, and the wheel rotated so that imperfections in its manufacture can be noted. These operations consume a great deal of time and as the adjustments must be very minute, to ascertain the smallest imperfections, it was sometimes necessary for the set screw to be loosened and tightened time and time again, until the correct adjustments had been made and the testing point brought into contact with the balance wheel where desired.

With my improved index guide, all the foregoing is avoided. The plate 8 is secured to the jaw 2. To move the testing point 18 into contact with the balance wheel edge the parallel bars are merely pivoted forward or backward until the testing point is brought into contact with the balance wheel where desired, the pins 11 and 15 holding the parts together with sufficient friction so that the parts retain their adjusted position. When the testing point is brought into contact with the periphery of the wheel, its edge or the inner side of the encircling band of the wheel, as shown in dotted lines in Fig. 1, the wheel 5 is rotated on its arbor 6 and all imperfections or irregularities of construction noted. The pivotal connection between the block 16 and testing point 18 is made to further assist in obtaining the adjustment desired.

From the foregoing description of my invention, it is obvious that the same is not restricted thereto, but is broad enough to cover all structures that come within the scope of the annexed claims.

What I claim is:

1. A device of the class described comprising a pair of jaws, a plate adjustably mounted on one of said jaws, parallel bars pivotally mounted on said plate and a testing point pivotally mounted on said parallel bars at points equally distant from the pivots where the parallel bars are pivoted to the plate.

2. A device of the kind described, comprising a pair of jaws movable to or from each other and adapted to hold a balance wheel between them, a plate adjustably secured to one of said jaws, a bar pivoted to said plate, a testing point pivoted to said bar adjacent its end, a further bar pivoted to said plate and to said testing point between its ends, the bars being disposed in parallelism, the end of the latter bar being adapted to form an operating handle, the pivots for the testing point being equally distant from the points where the bars are pivoted to the plate.

3. A device of the class described, comprising a pair of jaws, a slotted plate secured to one of said jaws, means for allowing an adjustment of said plate transversely of the jaw to which it is secured, parallel bars pivotally secured to said plate, a block pivotally mounted on said parallel bars and a testing point mounted in said block, the pivots for the block being equally distant from the points where the bars are pivoted to the plate.

4. A device of the class described comprising a pair of jaws, a slotted plate adjustably secured to one of said jaws, a set screw for holding in adjustment said plate transversely of the jaws, parallel bars pivotally secured to the plate and extending transversely of the jaws and a testing point pivotally secured to said parallel bars at points equally distant from the pivots where the parallel bars are pivoted to the plate.

5. A device of the class described, comprising a pair of jaws, a recess in one of said jaws, a plate adjustably mounted in said recess, a pair of parallel bars pivotally secured to said plate and extending transversely of the jaws and a testing point mounted on said bars and extending transversely of the same.

Signed at the city of Cleveland, county of Cuyahoga, and State of Ohio, this 11th day of January, 1915.

WILLIAM H. GRAFTON.

Witnesses:
H. R. AVERY,
HAL HICKMAN.

Copies of this patent may be obtained for five cents each, by addressing the "Commissioner of Patents, Washington, D. C."